United States Patent [19]
Dahm

[11] Patent Number: 5,422,456
[45] Date of Patent: Jun. 6, 1995

[54] ORBITAL HEAD LASER WELDER

[76] Inventor: Jonathan S. Dahm, 2525 Arapahoe Rd. #128, Boulder, Colo. 80302

[21] Appl. No.: 114,450

[22] Filed: Aug. 31, 1993

[51] Int. Cl.⁶ .................. B23K 26/02; B23K 26/06
[52] U.S. Cl. ................... 219/121.63; 219/121.64; 219/121.85; 219/121.82; 219/121.86
[58] Field of Search .............. 219/604, 61, 74, 121.63, 219/121.64, 121.13, 121.14, 121.22, 121.86, 121.43, 121.85; 228/25-29, 32

[56] References Cited
U.S. PATENT DOCUMENTS

| | | |
|---|---|---|
| 3,095,844 | 7/1963 | Thielsch . |
| 3,622,743 | 11/1971 | Muncheryan . |
| 4,080,525 | 3/1978 | Gobetz . |
| 4,162,390 | 7/1979 | Kelly . |
| 4,196,334 | 4/1980 | Thome ................................. 219/61 |
| 4,370,541 | 1/1983 | de Sivry . |
| 4,372,474 | 2/1983 | Taff . |
| 4,414,460 | 11/1983 | Sudo . |
| 4,429,211 | 4/1984 | Carstens . |
| 4,527,042 | 7/1985 | Shinohara . |
| 4,533,814 | 8/1985 | Ward . |
| 4,564,736 | 1/1986 | Jones . |
| 4,577,087 | 3/1986 | Chadwick ..................... 219/121.63 |
| 4,578,554 | 3/1981 | Coulter . |
| 4,580,334 | 4/1986 | McCracken . |
| 4,644,129 | 2/1987 | Miller . |
| 4,673,795 | 6/1987 | Ortiz, Jr. . |
| 4,810,848 | 3/1989 | Kaszlauskas . |
| 4,879,450 | 11/1989 | Valentin . |
| 4,906,812 | 3/1990 | Nied . |
| 4,963,714 | 10/1990 | Adamski . |
| 5,107,090 | 4/1992 | Caillet . |
| 5,117,086 | 5/1992 | Boudot . |
| 5,196,664 | 3/1993 | McGushion . |

FOREIGN PATENT DOCUMENTS
3620585 6/1986 Germany .

OTHER PUBLICATIONS

"Cajon Weld Fittings", Mar., 1992, 4 pages.
"BN" Series Bellows Sealed Valves, May 1991, 4 pages.
AMI-Arc Machines, Inc., Model 9CT Cassette-Type Weld Heads, 9-500 WH—Apr., 1990/E, 4 pages.
"Cajon Micro Weld Head", Ca-492, May, 1992, 2 pages.
"Cajon Welding System", 4 pages.
"Metal Fume-Free Welding Technology", Yasumitsu Mizuguchi, J. Electrochem. Soc. vol. 140, No. 6, Jun. 1993, 2 pages.
"The Technology of Chromium Oxide Passivation on Stainless Steel Surface" Tadahiro Ohmi et al, J. Electrochem. Soc. vol. 140, o. 6, Jun. 1993, 3 pages.

Primary Examiner—Mark H. Paschall
Attorney, Agent, or Firm—St. Onge Steward Johnston & Reens

[57] ABSTRACT

A laser welder is provided comprising an optical fiber, a wheel including a slot for receiving an article to be welded, the optical fiber mounted to and wound upon the wheel as the wheel is rotated to bring the fiber around the article, and a sleeve for sealing to the article to establish a chamber surrounding the weld zone, the sleeve having a curved window for transmitting the laser light from the fiber to the weld zone. In another aspect, the invention provides the sealing sleeve for use in laser welding. The sleeve preferably includes a ring deformable to clamp the sleeve to the article and center the article along an axis of the sleeve. A pump is preferably also provided which removes oxygen from the weld zone chamber, so that pressurized inert gas can be introduced to reduce oxidation and vaporization. In a further aspect, the invention relates to a method of welding articles.

27 Claims, 7 Drawing Sheets

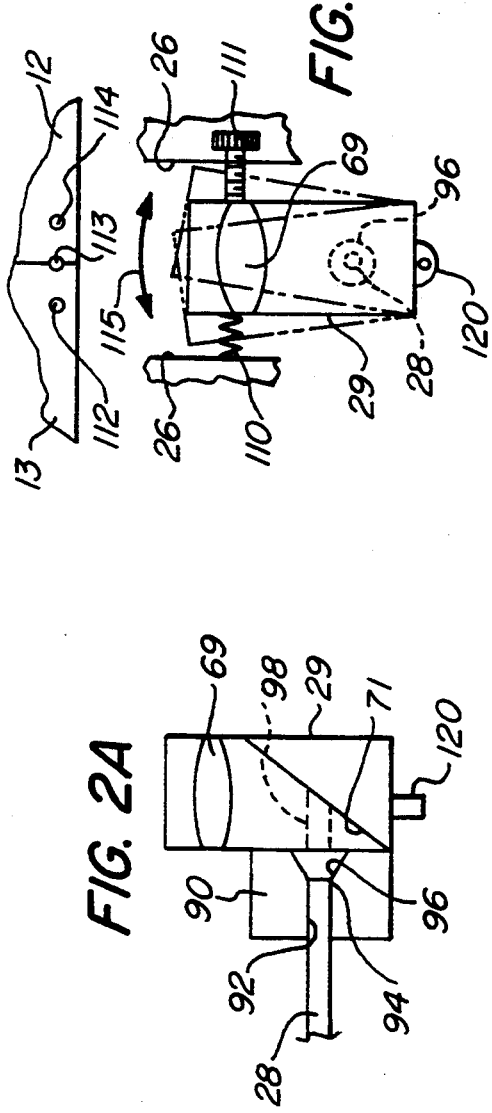
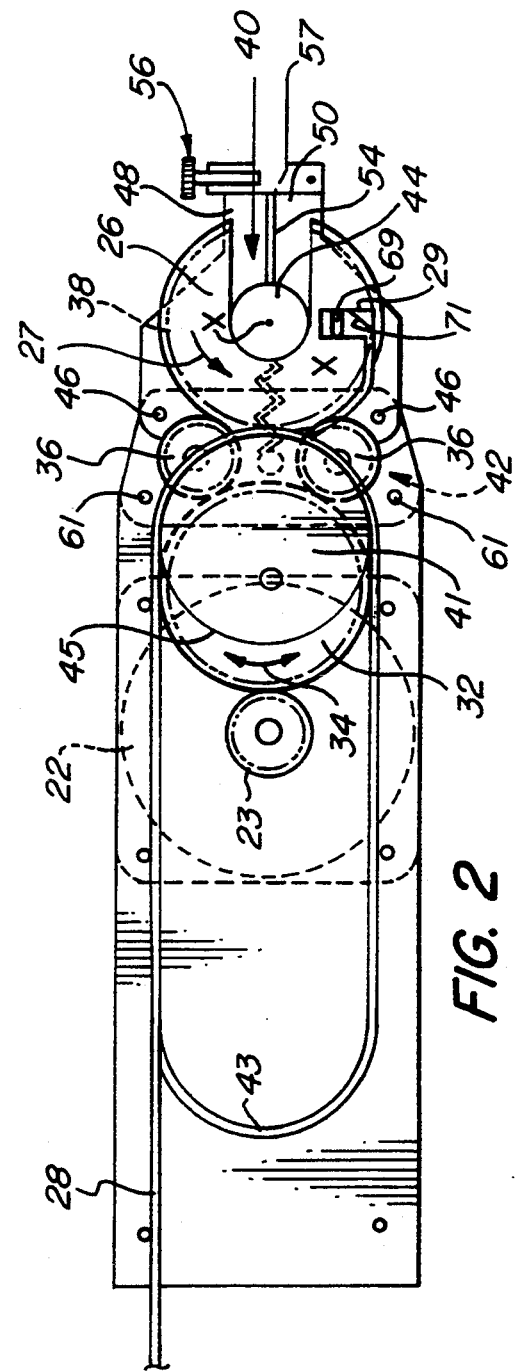

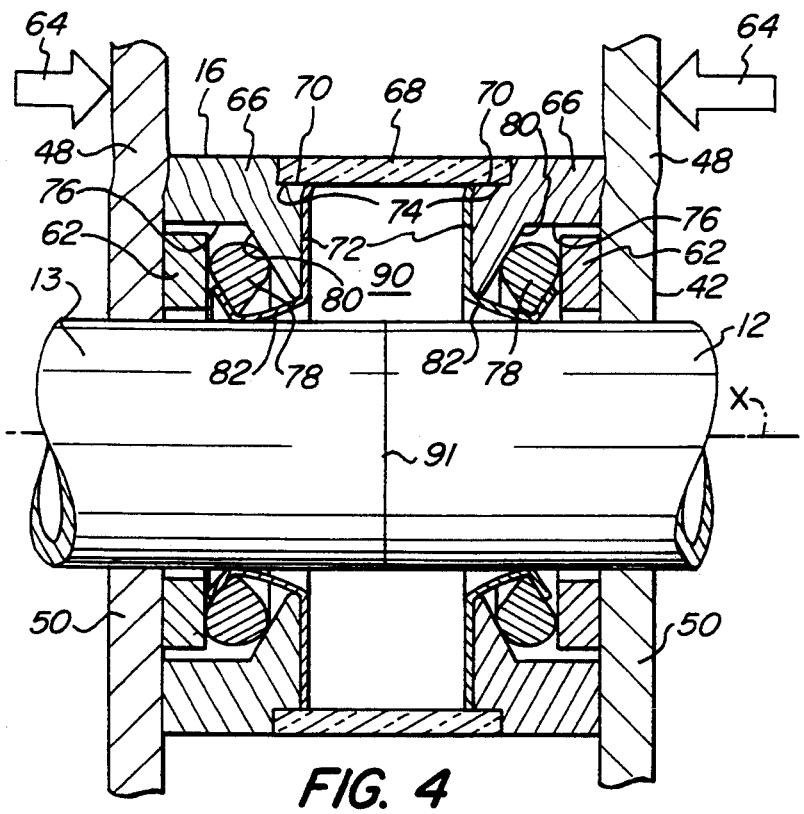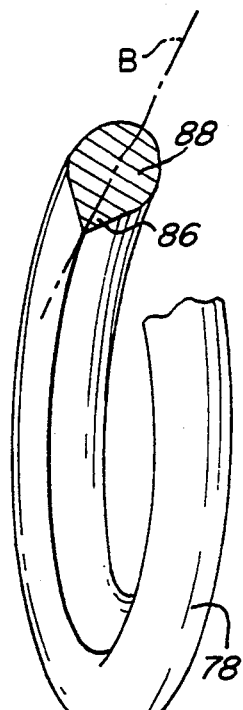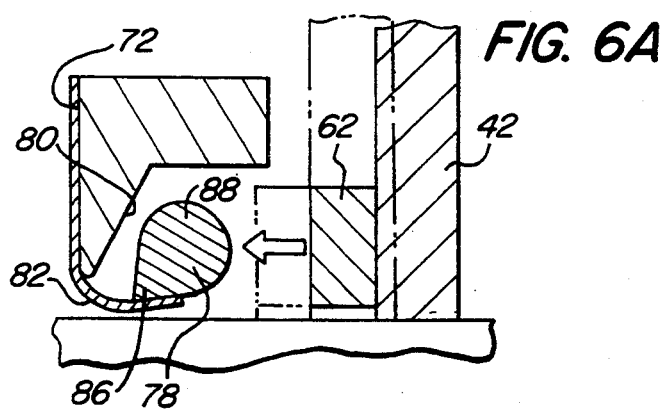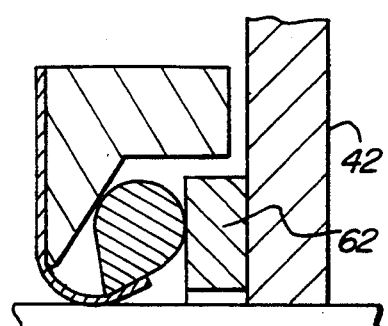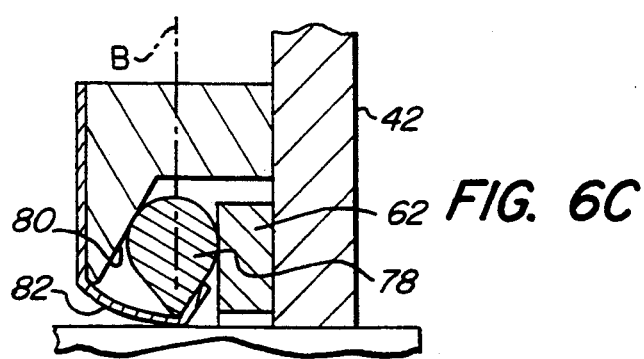
FIG. 4
FIG. 5
FIG. 6A
FIG. 6B
FIG. 6C

ORBITAL HEAD LASER WELDER

FIELD OF THE INVENTION

The invention relates to a laser welder and, more particularly, to a laser welder and a sealing sleeve and method for providing exceptionally clean welds in tight spaces for applications such as semiconductor process gas systems.

BACKGROUND OF THE INVENTION

As semiconductor devices have become more highly integrated, the wafer feature dimensions and depth profile have been reduced to below the subhalf micron level. To achieve high device reliability and low defect rates, it is essential to maintain an ultraclean environment on the wafer. This requirement has placed a demand for higher gas system performance which in return demands cleaner welding technology. The process gas systems typically include an intricate array of tightly packed gas lines and valves which must be welded together. Very often, gas system welding is done in a clean room or like environment to reduce the incidence of particulate contaminants and an inert gas jet is used to reduce oxidation of molten stainless steel in the weld pool. The quantity of molten metal at the weld spot, and the environment at the weld zone created by the welder and the welding method itself are generally the greatest source of gas panel weld contamination.

Automatic orbital head arc welding systems are known and used to weld stainless steel gas panels. The systems disclosed in U.S. Pat. Nos. 4,370,541 5,196,664 5,107,090 4,810,848 and 4,372,474 include a variety of features and weld head constructions. Arc welding systems generally produce high levels of heat which cause excessive melting and vaporization. Molten metal may trap particulates or oxidize and increase the incidence of contamination. Similarly, vaporization of corrosion resistant metal in the alloy being welded may lead to increased corrosion at the weld and possible contamination.

The '664 patent discloses a hinged clamp having an inert gas discharge to produce an increased purity weld by providing the gas in a stream which does not pass over particle-generating components such as gears. Though this may reduce the incidence of particles blown directly onto the weld, it does not eliminate generation of particles in the weld environment. Further, the gas jet may reduce, but does not eliminate oxidation of molten metal in the weld pool, does not limit vaporization of corrosion resistant alloys, and may even spatter the molten metal, if the pressure of the jet is raised in an attempt to improve weld purity, creating particulate contaminants.

The '541 patent discloses an envelope 7 which surrounds the weld zone and includes electron gun 13 within an enclosure 6 which is evacuated to limit weld pool oxidation. The welding element must be within the vacuum chamber so it can arc to the tube and affect the weld. As a consequence, the chamber must be large enough to include the entire weld head. This arrangement, therefore, can not readily be used for applications such as gas panels in which welds must be made in areas which often do not provide sufficient space to establish a surrounding vacuum chamber, and inherently limits weld purity since the weld zone includes moving parts which may generate particulate contaminants.

Laser welding is also well known in the prior art. U.S. Pat. Nos. 4,879,450 4,141,460 4,162,390 and German Patent Application No. 3620585 A1 disclose a variety of laser welding techniques for manufacturing a number of different products. The German application relates to laser welding a cold solder joint. The '042 patent relates to laser sealing vacuum insulated bottles. The '450 patent relates to welding pressure transducers, watch crystals or other parts wherein one part is permeable to a laser beam. The '460 patent relates to sealing light bulbs by melting an aperture blockade member. The '390 patent relates to using a gas stream and exhaust port for simultaneously cooling the light transmitter, deflecting ionized particles, and removing weld debris. None of the techniques appear to be directed to welding tubes in abutment in tight spaces, or to include a pressurized chamber for the purpose of obtaining high purity welds in tight spaces.

U.S. Pat. Nos. 4,080,525 4,429,211 and 4,533,814 disclose laser pipe welding apparatuses which include reflectors for aligning and focusing the beam. In the '814 device, the reflector is moved around the pipe by hinged arms. U.S. Pat. Nos. 4,578,554 4,564,736 4,673,795 4,963,714 and 4,906,812 disclose fiber optic laser welding devices having a variety of features. The '812 device mechanically engages and applies pressure to the workpiece. The '736 device is handheld and includes an inert gas jet. None of these devices apparently include a pressurized chamber, or appear particularly adapted to welding in tight spaces or producing clean, repeatable welds.

What is desired, therefore, is a laser welder that provides low heat input, clean welds in tight spaces such as a gas delivery panel.

SUMMARY OF THE INVENTION

Accordingly, it is an object of the invention to provide a laser welder producing high purity welds in tight spaces.

Another object of the invention is to provide a laser welder in which a high pressure inert gas chamber surrounds the weld zone and the laser shines through the chamber to affect the weld.

Yet another object of the invention is to provide a laser welder of the above character including an orbital weld head.

Still another object of the invention is to provide a laser welder of the above character including a fiber optic cable for transmitting the laser.

A further object of the invention is to provide a sealing sleeve for use with a laser welder of the above character to form the chamber, an inner surface of the sleeve coated with a corrosion resistant metal in the alloy forming articles being welded.

Yet a further object of the invention is to provide a sealing sleeve of the above character including a window coated with Hafnium oxide to reduce the reactivity of the window.

Still a further object of the invention is to provide a sealing sleeve of the above character formed from spinel.

Yet a further object is to provide a method of laser welding using a laser welder of the above character.

These and other objects are achieved by provision of a laser welder comprising an optical fiber, a wheel including a slot for receiving an article to be welded, the optical fiber mounted to and wound upon the wheel as the wheel is rotated to bring the fiber around the article, and a sleeve for sealing to the article to establish a chamber surrounding the weld zone, the sleeve having a curved window for transmitting the laser light from the fiber to the weld zone.

The sleeve preferably includes a sealing ring deformable to clamp the sleeve to the article and center the article along an axis of the sleeve. A pump is preferably also provided which removes oxygen from the weld zone chamber. Most preferably, a source for introducing pressurized inert gas to the chamber is provided to reduce oxidation and vaporization of the molten metal. A lens mounted on the wheel preferably focuses laser light leaving the fiber to a spot in the weld zone while also spreading the light over a wide area on the window.

The laser is preferably an Nd:YAG laser operating in continuous wave mode. The laser may have a quasi-continuous operating mode to reduce total heat input and may also include a Q-switched operating mode which creates a high energy burst at the end of each period to burn energy-absorbing material off of the window.

In another aspect the invention provides a sleeve having a sealing ring for sealing the sleeve to the article being welded. The sealing ring is preferably a Bellville washer or cam ring which is deformable to reduce its inner diameter and seal the sleeve to the article. The sealing sleeve is preferably formed from a spinel or soft metal or other transparent material, and includes a transparent portion or window. Nontransparent portion of the sleeve preferably also includes a coating of a corrosion resistant metal in the alloy being welded (e.g., chromium for stainless steel). The coating prevents outgassing of the sleeve material and increases the presence of corrosion resistant metal in the weld zone to improve weld quality. The sleeve window for transmitting laser light is preferably a spinel, low water quartz, Corning glass or Aluminum Oxy Nitride, and is also preferably coated with an oxide of a transition metal of Group IVB of the Periodic Table, most preferably Hafnium, to reduce reactivity of and insulate the window.

In a further aspect, the invention relates to a method of welding articles comprising the steps of placing a sleeve having a transparent region over the article, sealing the sleeve to the article such that the transparent region is adjacent to a weld zone, pumping air out of the sleeve, pumping pressurized inert gas into the sleeve to reduce vaporization, and directing laser light from an optical fiber through the transparent region toward the article.

The invention and its particular features and advantages will become more apparent from the following detailed description considered with reference to the accompanying drawings.

BRIEF DESCRIPTION OF THE DRAWINGS

FIG. 1A is partially exploded and cut away to reveal components of the weld head and fixturing device.

FIG. 2 is a front elevation view of the laser welder of FIG. 1 with the front portion of the housing and fixture removed to illustrate the drive mechanism and optical fiber path.

FIG. 2B is an enlarged side view of the lens column of the laser welder of FIG. 1.

FIG. 2A is an enlarged partial schematic view of the lens column and optical fiber of the laser welder of FIG. 1.

FIG. 4 is an enlarged front cross-sectional view of one embodiment of the sealing sleeve of the laser welder system of FIG. 1.

FIG. 5 is a further enlarged view of the sealing cam ring of the sealing sleeve embodiment of FIG. 2.

FIGS. 6A–6C are a series of enlarged partial views of the sealing sleeve embodiment of FIG. 2 and the fixturing device of FIG. 1 which illustrate operation of the sealing cam ring of FIG. 3 upon tightening of the fixturing device.

DETAILED DESCRIPTION OF THE INVENTION

Figure 1:
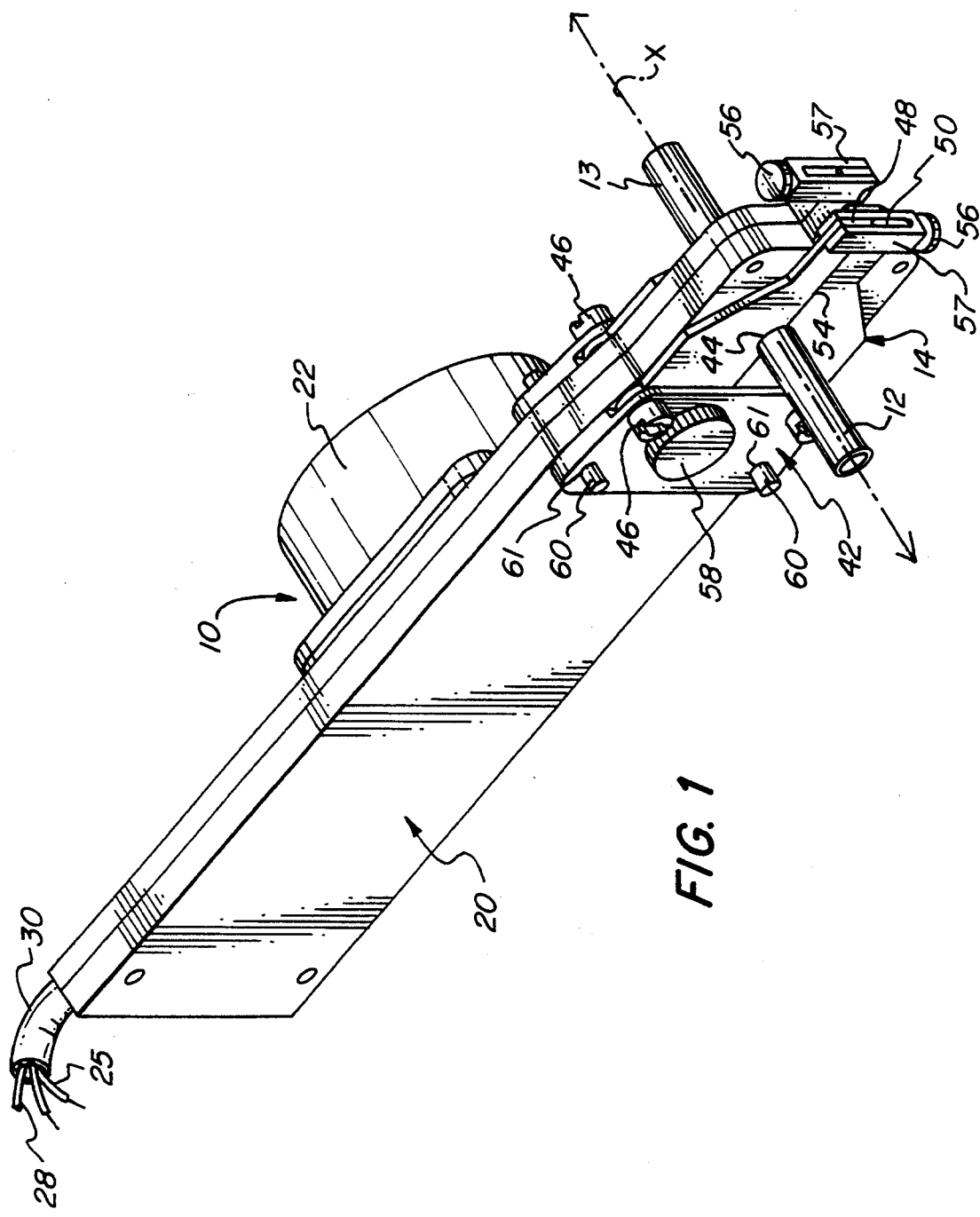
FIGS. 1 and 1A are front isometric views of a laser welder in accordance with the invention.
Figure 1A:
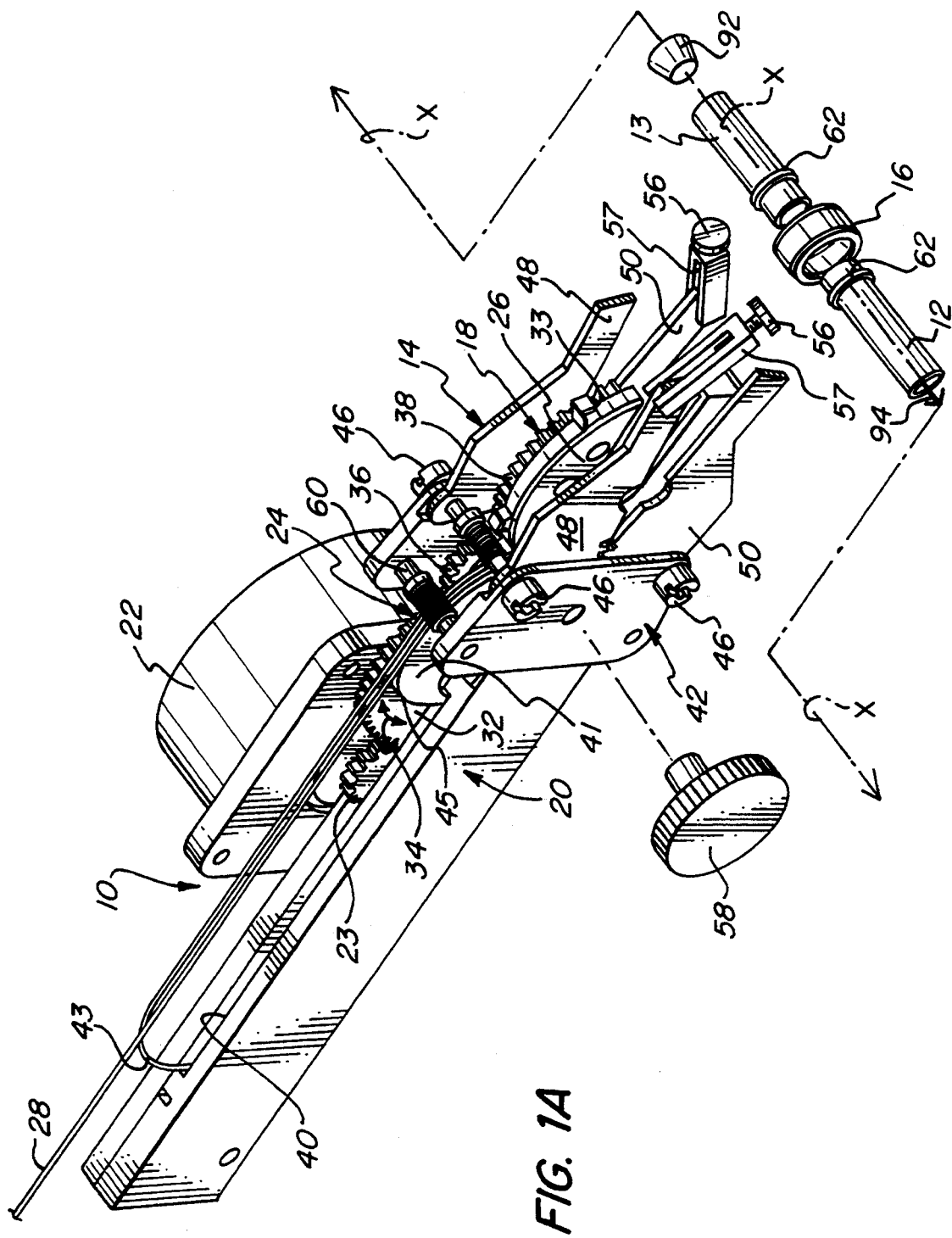

FIGS. 1 and 1A are front isometric views of an orbital head laser welder 10 in accordance with the invention. In FIG. 1, welder 10 is shown fully assembled to weld tubes 12, 13 together in abutment. In FIG. 1A, welder 10 is shown in a partially exploded and broken away view illustrating the components and their assembly to weld tubes 12, 13 or other articles.

Orbital head laser welder 10 generally comprises a fixture 14 for holding tubes 12, 13, a sleeve 16, 16', 16" for sealing around a weld zone 90 (see FIGS. 1A, 4, 7 and 9) at abutting ends of tubes 12, 13, and a weld head 18 for directing laser light completely around tubes 12, 13 at the weld zone. Laser welding is preferable to TIG welding for clean weld applications because laser welding uses less heat input and thus changes the molecular structure of the stainless steel or other weld material less; creates less vaporization, and thus reduces loss of corrosion resistant alloy metals (e.g., chromium or manganese in stainless steel); and welds with a narrower and smoother bead reducing the incidence of entrapped contaminating particles and reducing the area exposed to corrosion and/or oxidation.

Weld head 18 includes a housing 20 preferably sized to be grasped by a user's hand which encloses gear train 24, and mounting wheel 26. A conduit 30 connected to housing 20 contains an optical fiber 28 and electrical cables 25 for controlling motor 22 mounted in housing 20. Conduit 30 leads to a remote laser light source (not shown) and electronic controller (also not shown). It is understood that, if desired, the laser and the controller could be contained within housing 20, however weld head 18 may then not be sufficiently maneuverable to weld tubes or other articles in tight spaces.

The laser is preferably an Nd:YAG, Ho:YAG, or diode laser operating in continuous-wave mode for welding. A HeNe or other visible laser is used to focus and position the beam on the weld spot. It is understood that the laser may also have a quasi-continuous-wave mode of operation in order to further reduce the amount of heat input to the tubes without appreciably reducing smoothness of the weld bead and consequent improvement in weld purity.

Referring now to FIGS. 1A and 2, motor 22 and drive pinion 23 are bidirectionally drivable to rotate pinion 32 of gear train 24 in both clockwise and counter clockwise directions as indicated by arrow 34. By intermediate gears 36, pinion 32 rotates ring gear 38 in the same direction drive pinion 23 is rotated.

Figure 3:
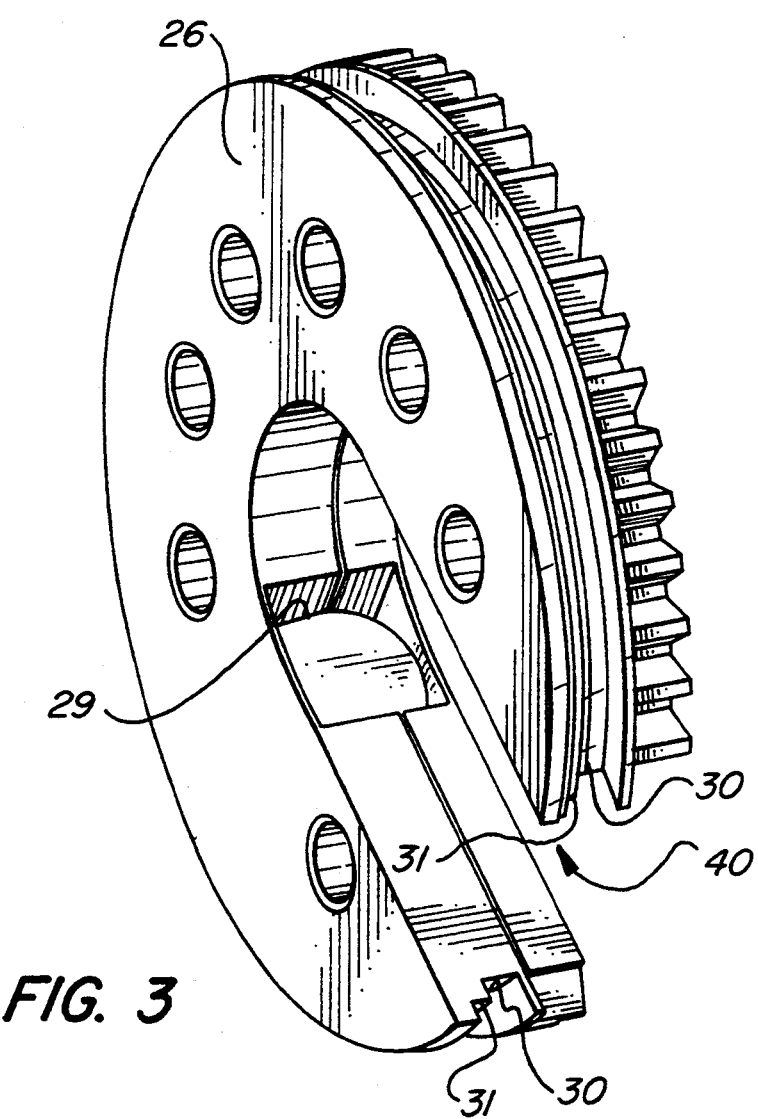
FIG. 3 is an enlarged isometric view of the wheel and ring gear of the laser welder of FIG. 1.

Referring now also to FIG. 3, ring gear 38 is connected to mounting wheel 26 which receives optical fiber 28 connected to lens column 29 so as to direct laser light toward axis X of rotation of ring gear 38. Ring gear 38 and mounting wheel 26 both include a slot or cut out portion 40 for receiving tubes 12, 13 or other articles to be welded along axis X. Drive pinion 23 rotates ring gear 38 and connected mounting wheel 26 in a first direction indicated by arrow 27 (see FIG. 2) to advance optical fiber 28 360° around tubes 12, 13, and then drives ring gear 38 and connected mounting wheel 26 back in the opposite direction to permit welder 10 to be removed from end welded tubes 12, 13. Preferably, motor 22 is relatively high speed, capable of advancing optical fiber 28 through 360° in about 0.5 seconds. This advantageously reduces the total amount of heat input to the tubes, and thus reduces the total amount of molten metal which might oxidize and cause contamination and reduces the volatilization of corrosion resistant alloying elements.

As ring gear 38 is rotated, optical fiber 28 is wound and unwound around mounting wheel 26 which is provided with a groove 30 of a sufficient diameter to prevent rupture, cracking or breakage of the fiber. Slack portions of optical fiber 28 are stored in a take-up box 40 within housing 20 (see FIG. 1A) which includes minimum radius block 41. A second groove 31 in mounting wheel 26 receives a ring 33 (see FIG. 1A) provided as a part of housing 20 which retains fiber 28 within groove 30 and also serves as a bearing for rotation of ring gear 38. Fiber 28 enters housing 20 turns around block 41 providing a safe radius and forms a loop 43 of slack within take-up box 40 and returns to block 41 where it is again introduced to groove 30 and then mounted on wheel 26. When fiber 28 has been advanced 360° around tubes 12, 13 loop 43 of fiber 28 advances within take-up box 40 to edge 45 of minimum radius block 41.

Generally, relatively thin fibers, having a thickness of about 400 μm, are preferred since they typically require a relatively smaller safe-winding diameter. It is understood, however, that due to the power requirements for welding stainless steel and other materials, only certain minimum thicknesses may be used for a given optical fiber composition. Thus, the choice of optical fiber may be limited. 3M's step-index optical fiber having a thickness of 400 μm, and a minimum bend radius of about 20 mm has been found to be effective for stainless steel gas system welding. Further, by introducing laser light to the optical fiber at a slight angle of about 3°–5° to the fiber axis, fibers are generally capable of providing consistent radial intensity so that the melt pool is evenly heated and the peak temperature of the molten metal is reduced.

Referring to FIG. 2A, lens column 29 is shown in an enlarged view to illustrate attachment of optical fiber 28. Fiber 28 is surrounded by and terminates within a ceramic collar 90. Collar 90 includes a passage 92 for receiving fiber 28. At termination point 94, passage 92 flares outwardly away from fiber 28 in the direction of lens column 29. Flared surface 96 includes a reflective coating to combine lower intensity light at the fringes to form a beam 98 having a more uniform radial intensity.

Referring to FIG. 2B, lens column 29 is pivotally mounted at 120 to mounting wheel 26 between a spring 110 and an adjustment screw 111 for adjusting the position of a weld spot 112, 113, 114 so that it lies on weld line 91.

Fixture 14 comprises a pair of opposing plates 42 including holes 44 for receiving and holding tubes 12, 13 or other articles to be welded. To accommodate tubes having different sizes, one or both of plates 42 may be replaced or collets (not shown) may be fitted in holes 44. Although illustrated as integral in one piece with weld head 10, it is understood that fixture 14 may be provided as a separate component.

Each of fixture plates 42 includes hinges 46 for moving pivoting portions 48, 50 of plates 42 away from axis X to receive tubes 12, 13 in holes 44 thereof. In this regard, the line 54 which separates pivoting portions of 48, 50 plates 42 intersects holes 44. A threaded rod 56 and cooperating latch 57 connect the pivoting portions 48, 50 and clamps holes 44 around tubes 12, 13.

Fixture 14 is connected to, or maybe mounted over, weld head 18 such that holes 44 are centered on axis X. Another threaded rod or the like 58 is provided to move fixture plates 42 toward and away from each other in a direction parallel to axis X. One or more guide shafts 60 on one plate 42 received by holes 61 in the other plate 42 insure that holes 44 of opposing plates are maintained in alignment (see FIG. 1).

As plates 42 move inwardly, they press spacers 62 (see FIG. 1A) into ends of sleeve 16, 16' 16" to seal it to tubes 12, 13. It is understood that spacers 62 may also be provided molded directly on plates 42 in the form of lips or ridges 63 surrounding holes 44 (see FIG. 7).

Figure 7:
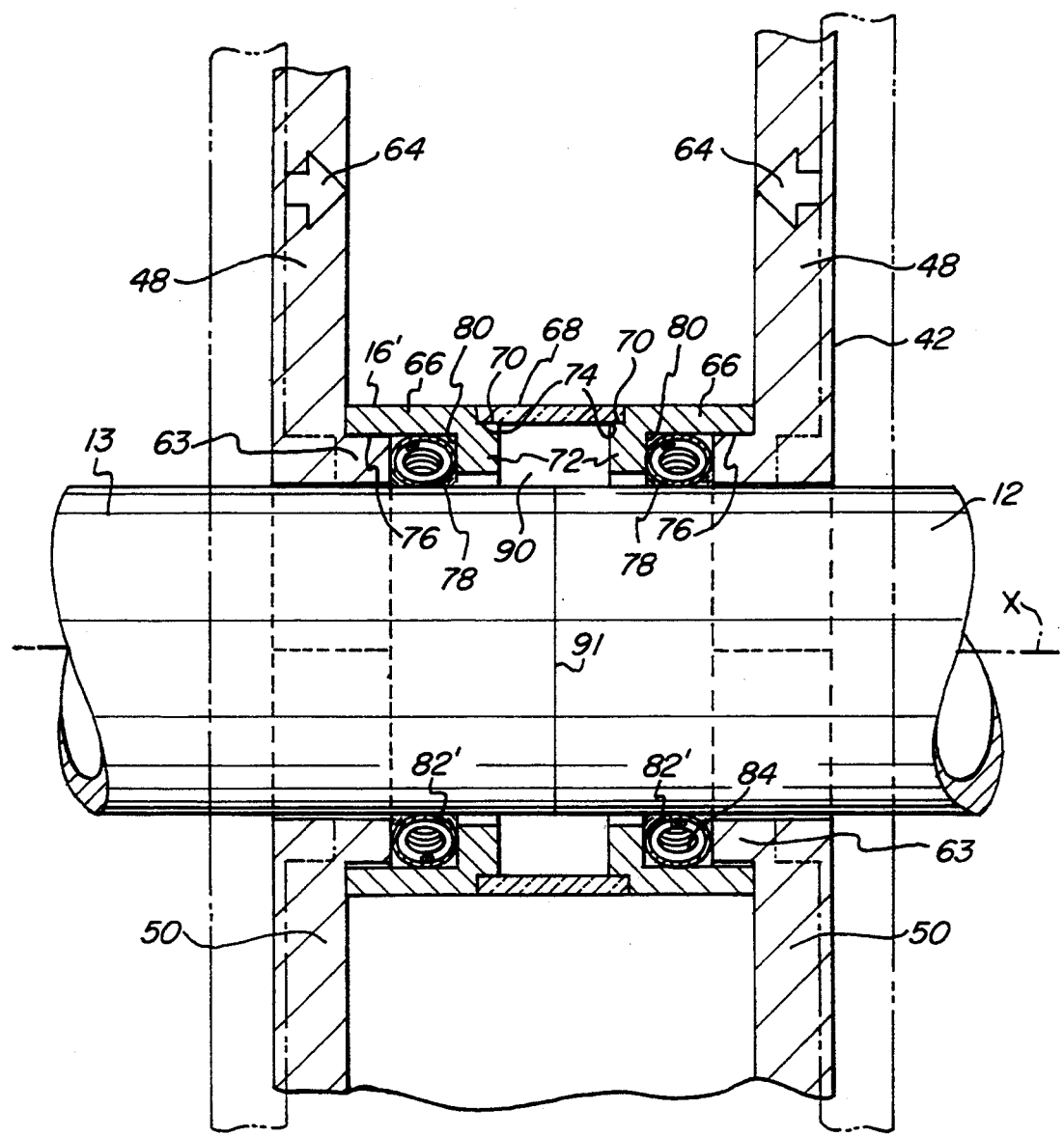
FIG. 7 is an enlarged front cross-sectional view of another embodiment of the sealing sleeve of the laser welder of FIG. 1.
Figure 8:
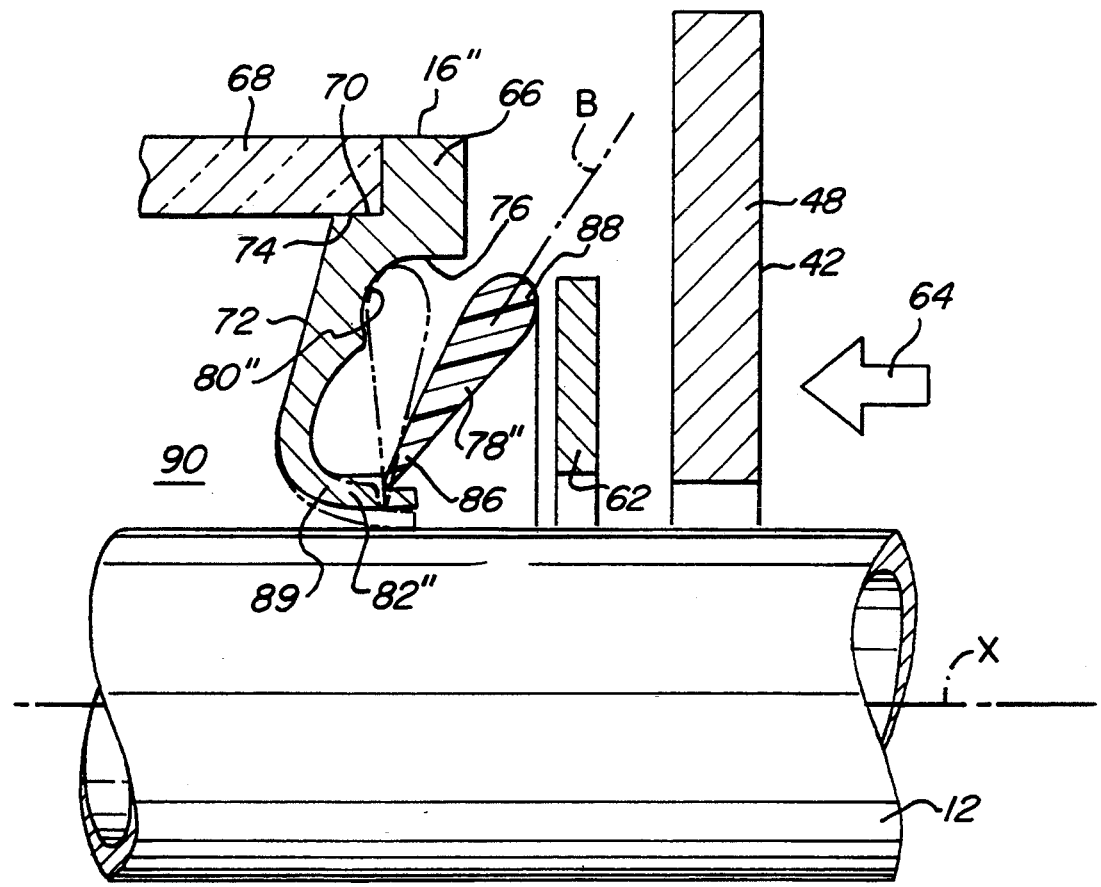
FIG. 8 is an enlarged partial front cross-sectional view of another embodiment of the sealing sleeve of the laser welder of FIG. 1.

Referring now to FIGS. 4 and 7, two embodiments 16 and 16' of the sealing sleeve are shown in enlarged, cross-sectional views sealed to tubes 12, 13 after plates 42 have been moved inwardly, as indicated by arrows 64, to clamp on either side of sleeve 16. In FIG. 8, embodiment 16" of the sealing sleeve is shown in an enlarged partial schematic view prior to movement of plates 42 in the direction of arrow 64.

Sleeve 16" is the preferred embodiment, however, sleeves 16, 16' and 16" will initially be jointly discussed since they have many common features. Sleeves 16, 16', 16" comprise a pair of inserts 66 and curved windows 68 made from spinel, quartz, Corning glass, Aluminum Oxy Nitride or preferably a spinel ($MgAl_2O_4$)—most preferably with a low water content to reduce the possibility of oxidizing molten steel by reducing the possibility that the laser light shining through window 68 will release water molecules trapped in the window. The inside surface of window 68 is coated with an oxide of a Group IVB transition metal, preferably Hafnium, to reduce reactivity of the window and thermally insulate it.

Inserts 66 include grooves 70 in surfaces 72 for sealingly receiving an edge 74 of curved window 68. Window 68 transmits laser light from optical fiber 28 onto tubes 12, 13. A lens 69 focusses the laser light to a desired spot within weld zone 90. Lens column 29 also includes a mirror 71 (also see FIG. 2) for reflecting laser light leaving fiber 28 through 90° toward lens 69. Preferably, lens 69 produces a converging beam which provides maximum power on the weld spot while spreading laser power over a fairly large area on spinel window 68 to reduce the possibility of overheating. In this regard, the laser may also be provided with a Q-switched mode of operation which produce a high energy burst at the end of each peak of the modulated sinusoidal wave which effectively vaporizes any material accumulated on window 68 that might absorb laser energy and cause overheating.

Inserts 66 of sleeves 16, 16' are formed from a spinel or plastic and are fairly rigid. Inserts 66 of sleeve 16" however are formed from a soft metal such as copper which is deformable to seal with tubes 12, 13. Especially where inserts 66 are formed from plastic, but also with other inserts, surfaces 72 of sleeve 16, 16', 16" directly beneath curved windows 68 are coated with a metal layer to prevent outgassing of inserts 66 at elevated welding temperatures which might, as with moisture in the quartz, lead to contamination of molten metal. Preferably, the coating is a corrosion resistant metal in the alloy being welded (e.g., chromium for stainless steel) which may increase the concentration of the corrosion resistant metal in the weld pool to improve weld corrosion resistance and hence purity. The coating is also preferably highly reflective (e.g., chromium) to prevent absorption of laser energy.

Inserts 66 include a recess 76 for receiving spacers 62 or ridges 63 pressed by fixture plates 42 within sleeve 16. Spacers 62 and ridges 63 press sealing rings 78, 78', 78" against surfaces 80, 80', 80" within sleeves 16, 16', 16" and deform rings 78, 78', 78" to reduce their inner diameters and create a seal between inserts 66 and tubes 12, 13. In this regard, deforming rings 78, 78', 78" reduce their inner diameter and causes them to clamp to and substantially center tubes 12, 13 within sleeves 16, 16', 16" along axis X, whereby the effect of mismatched tube or other article sizes may be minimized and compensated throughout the entire article circumference.

Surfaces 80, 80', 80" slope inwardly from recesses 76 toward axis X. In sleeve 16, surfaces 80 of inserts 66 also slope toward curved window 68 and the other insert 66. In sleeve 16", a portion of surfaces 80" of inserts 66 also slope toward window 68 and the other insert 66.

In each of sleeves 16, 16' and 16", a soft metal (e.g., copper) portion 82, 82', 82" forms the seal between inserts 66 and tubes 12, 13.

Ring 78' of sleeve 16' comprises an o-ring formed by an inner spring 84 and an outer layer of copper foil 82'. In operation, spacers 62 and fixture plates 42 deform springs 84 to press foil 82' into sealing contact with tubes 12, 13 and surfaces 80'.

Ring 78 of sleeve 16 is a cam ring, and ring 78" of sleeve 16" is a Bellville washer. In operation, spacers 62 deform rings 78, 78" to press copper sealing areas 82, 82" toward and into sealing contact with the articles 12, 13.

Referring to FIGS. 6A–6C, 5 and 8 rings 78, 78" have wedge-shaped cross sections with narrower, tapered ends 86 forming an inner diameter and with wider, rounded ends 88 forming an outer diameter. In operation, as spacers 62 press inwardly, (FIGS. 6A and 8), rounded ends 88 slide on surfaces 80, 80" and rotate deforming rings 78, 78" to reduce an inner diameter of the rings by causing a bisector B of the rings' cross sections (FIGS. 6B and 8) to move or rotate from an initial position substantially parallel to sloping surfaces 80, 80" to a final, sealed position more perpendicular to tubes 12, 13 (FIGS. 6C and 8 in dashed lines) with tapered end 86 sealingly pressing copper region 82, 82" against tubes 12, 13. Although not separately illustrated, it is understood that rings 78" of sleeve 16" operate in a very similar manner to seal soft metal flange 89 of sleeve 16" insert 66 to tubes 12, 13 as indicated by the dashed lines in FIG. 8.

The apparatus of the invention enables very clean welds to be made in tight spaces. Referring again to FIGS. 4, 7 and 8, sleeves 16, 16', 16" surround a weld zone 90 within which laser light from optical fiber 28 may be focussed to a weld spot and moved along a weld line 91. As illustrated in FIG. 1A, one of tubes 12, 13 is preferably closed or sealed with a plug 92 or gas panel valve and a pump (not shown) is connected to the other tube as indicated by arrow 94 to evacuate the weld zone. Removal of oxygen and particulates from the weld zone reduces the possibility of oxidation contamination. Sealing off weld zone also prevents particulates from sources, such as the weld head itself, from contaminating the weld pool.

Figure 9:
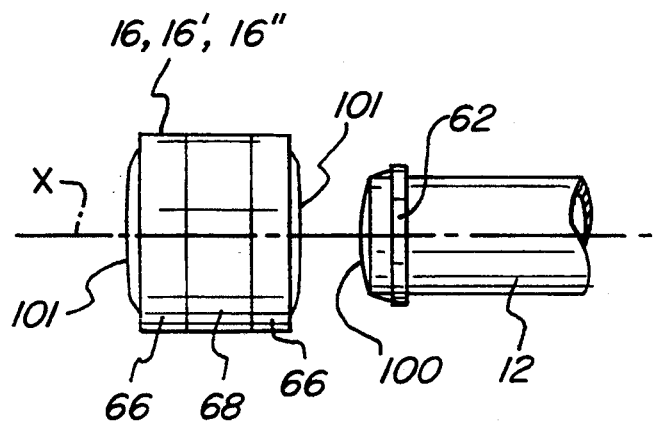
FIG. 9 is an enlarged partial view of the laser welder of FIG. 1 illustrating presealing of sleeves and tubes.

Referring now to FIG. 9, sleeves 16, 16', 16" are preferably sealed upon manufacture with membranes 101 to prevent contamination prior to use. Similarly, spacers 62 may include membranes 100 so that pre-mounting the spacers also seals the tubes prior to welding.

Even cleaner welds can be produced by introducing pressurized inert gas to weld zone 90 after evacuating it. At elevated pressure, the corrosion resistant alloying elements in stainless steel (e.g., chromium and manganese) tend to remain as liquids at weld temperatures and do not vaporize off and possibly form particulate contaminants. Further, the elevated pressure effectively allows faster welds because, without escaping vapor, the weld pool is hotter. Cleaner welds may also be achieved with reductions in weld zone volume, that is, by reducing the sealing sleeve size. A given temperature increase, such as that caused by welding, will provide a greater pressure increase within a smaller chamber. In addition to the advantages flowing from high pressure, a smaller chamber requires a smaller quantity of contaminating vapor to reach equilibrium with the weld pool.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A laser welder for tight spaces, comprising:
   an optical fiber for carrying laser light;
   a rotatable wheel including a slot for receiving an article to be welded in position at an axis of rotation of said wheel, said optical fiber for winding around said wheel as said wheel is rotated to bring said optical fiber around the article; a deflector mounted to said wheel for deflecting laser light leaving said optical fiber toward a weld zone at the wheel axis; and
   a sleeve for sealing to the article to establish a chamber surrounding the weld zone, the sleeve having a curved window for transmitting the laser light from said optical fiber to the weld zone.

2. The laser welder of claim 1 wherein said sleeve includes a ring deformable to reduce an inner diameter of said ring and clamp the sleeve to the article and center the article along the axis of rotation of said wheel.

3. The laser welder of claim 1 including a lens mounted to said wheel adjacent an end of said optical fiber, said lens for passing the laser light through the curved window over as large an area as possible while focussing the laser light to a spot in the weld zone.

4. The laser welder of claim 1 including a gas pump for removing oxygen from the sealed sleeve chamber.

5. The laser welder of claim 4 including means for filling the sealed sleeve chamber with pressurized inert gas.

6. The laser welder of claim 1 including a collar for receiving said optical fiber and connecting it to said wheel, said collar having a flared surface for increasing the uniformity of radial intensity in a beam exiting said fiber.

7. The laser welder of claim 1 including a laser for inputting the laser light to said optical fiber at angle of between about 3° and 5° to an axis of said fiber.

8. The laser welder of claim 1 including a laser for outputting the laser light to said optical fiber, the laser having a Q-switched operating mode for providing a periodic high energy burst to remove molten metal vapor which may accumulate on the curved window.

9. The laser welder of claim 1 including a laser for outputting the laser light to said optical fiber, the laser having a quasi-continuous operating mode to reduce the total amount of heat input to the article.

10. The laser welder of claim 1 including means for adjusting a position within the weld zone at which the laser light is directed.

11. The laser welder of claim 1 wherein the articles are received within said sleeve for welding, and including a membrane for sealing an open side of said sleeve to minimize contamination of said sleeve prior to welding.

12. The laser welder of claim 11 including a second membrane for sealing the article to prevent contamination of the article prior to welding.

13. A method of welding an article comprising the steps of:
    placing a sleeve having a transparent region over the article;
    sealing the sleeve to the article such that the transparent region is adjacent a weld zone;
    filling the sleeve with pressurized inert gas to reduce vaporization of metals in the alloy being welded;
    directing laser light from an optical fiber through the transparent region toward the article; and moving the optical fiber around the sleeve.

14. The welding method of claim 13 wherein the sleeve sealing step comprises clamping the sleeve to the article by deforming a ring within the sleeve to reduce an inner diameter of the ring.

15. The welding method of claim 14 wherein the clamping step comprises moving a pair of fixture plates axially together toward the sleeve to press the ring against a surface within the sleeve.

16. The welding method of claim 13 including the step centering the article along a longitudinal axis of the sleeve.

17. The welding method of claim 13 including the step of modulating the laser light between a range of non-zero values.

18. A sealing sleeve for laser welding an article held in position by a fixture plate, said sleeve comprising an insert, a curved window connected to the insert, and a ring for sealing said insert to the article, said insert having a surface extending toward an axis of the sleeve, said fixture plate for deforming said ring to reduce an inner diameter of the ring and seal the insert to the article.

19. The sealing sleeve of claim 18 wherein said surface slopes in a direction from said insert toward said curved window as it extends toward said axis.

20. The sealing sleeve of claim 18 wherein said ring slides along said sloped surface.

21. The sealing sleeve of claim 18 wherein said ring includes a wedge-shape cross section, a wider end of said ring for sliding on said sloped surface as said ring is pressed against said sloped surface.

22. The sealing sleeve of claim 19 wherein said insert includes a flange, wherein as said ring is pressed toward said sloped surface, a bisector of said ring cross section moves toward a position perpendicular with respect to the article as said ring deforms and a narrower end of said cam ring moves into contact with said flange to seal said flange to the article.

23. The sealing sleeve of claim 18 wherein said sleeve includes a coating on its inside surface, the coating comprising a corrosion resistant metal of the alloy being welded.

24. The sealing sleeve of claim 18 wherein said curved window is low water Quartz.

25. The sealing sleeve of claim 18 wherein said curved window is a spinel.

26. The sealing sleeve of claim 18 wherein said curved window includes a coating on its inside surface, the coating comprising an oxide of a transition metal of Group IVB of the Periodic Table.

27. The sealing sleeve of claim 18 including membranes for sealing the sleeve.

* * * * *